L. J. WICKS.
Straw Cutter.
No. 178.
A. I. Patented Oct. 13, 1857.
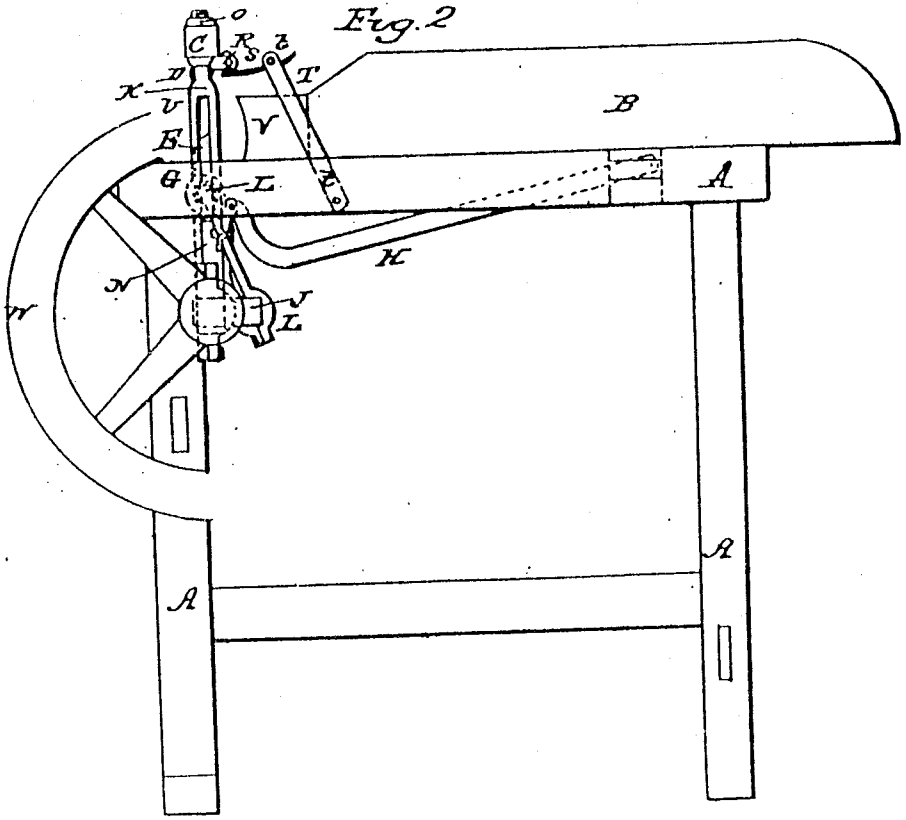
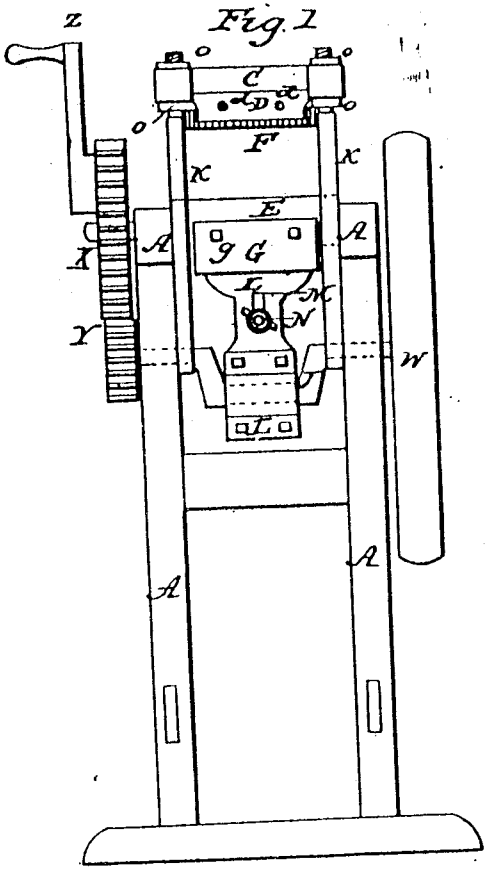
BEST AVAILABLE COPY